United States Patent [19]

Ordonez

[11] Patent Number: 4,665,962
[45] Date of Patent: May 19, 1987

[54] WOODWORKING MACHINE

[76] Inventor: Alberto S. Ordonez, Apartado 424, Gijon (Asturias), Spain

[21] Appl. No.: 805,893

[22] Filed: Dec. 6, 1985

[30] Foreign Application Priority Data

Feb. 13, 1985 [ES] Spain .................................. 540.373

[51] Int. Cl.⁴ .............................................. B27C 9/00
[52] U.S. Cl. ................. 144/3 R; 144/286 A; 144/1 R
[58] Field of Search .............. 144/1 R, 3 R, 286 R, 144/286 A, 1 G, 1 A

[56] References Cited

U.S. PATENT DOCUMENTS 1,506,154 8/1924 Berthelsen et al. ............. 144/286 R
3,815,647 6/1974 Piemont ............................. 144/1 G

*Primary Examiner*—W. D. Bray
*Attorney, Agent, or Firm*—Wood, Herron & Evans

[57] ABSTRACT

A multi-purpose woodworking machine designed to carry out with the maximum of safety various woodworking operations or jobs such as sawing, planing, sanding, drilling and mortising etc. The tool has an indexible prismatic head on the side walls of which various tool elements are mounted, the tools being driven by independent pulley wheels which in turn are driven by a motor through a transmission belt, or the like. A device for locking the head in a desired position is operable also to displace a base plate on which the drive motor is mounted so as to slacken the transmission belt when the head is unlocked. For driving at least one of the tools, an idler pulley wheel is provided for the transmission belt and this is arranged such that, the tool in question can be driven in any angular position of the head. The locking device is operable by a pedal so leaving the hands of the operator free.

9 Claims, 13 Drawing Figures

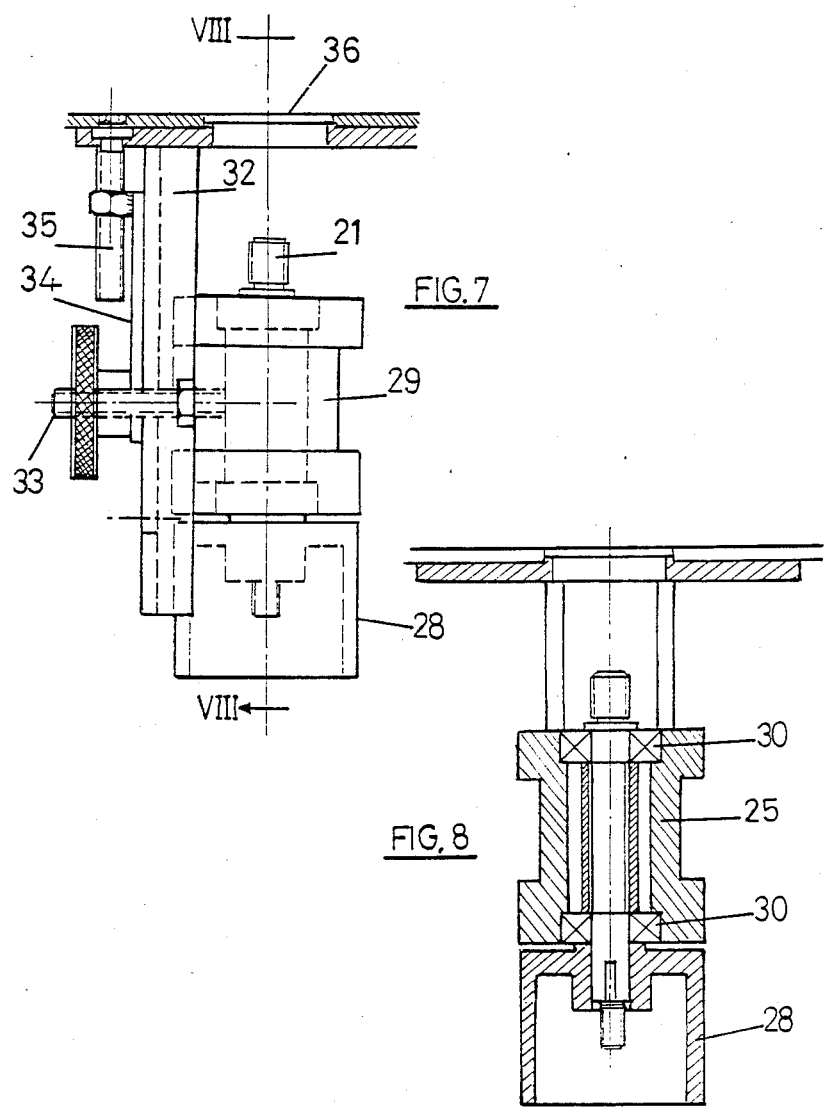

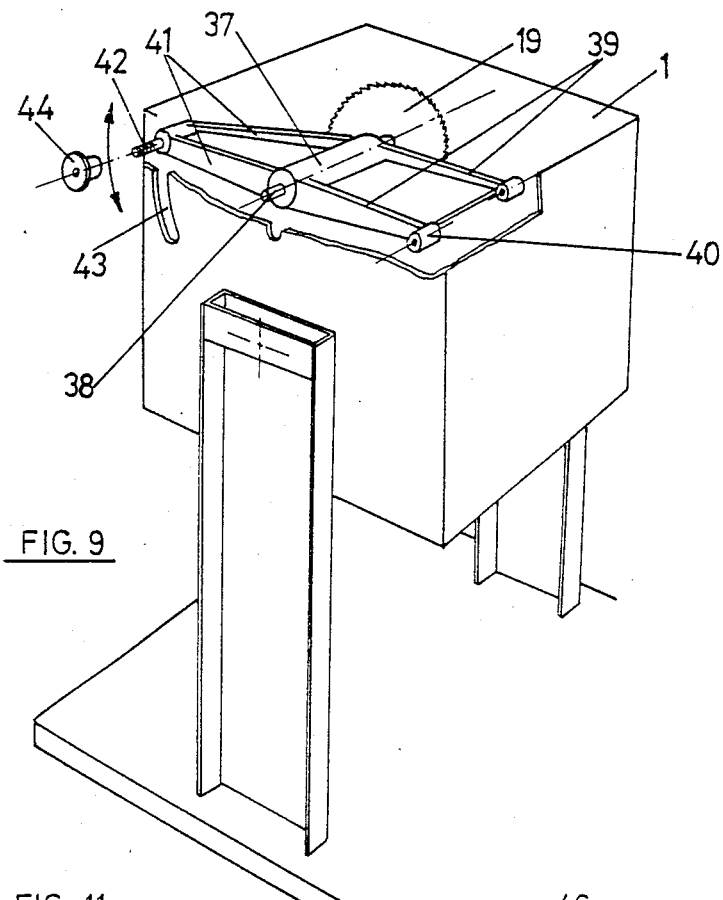
FIG. 9
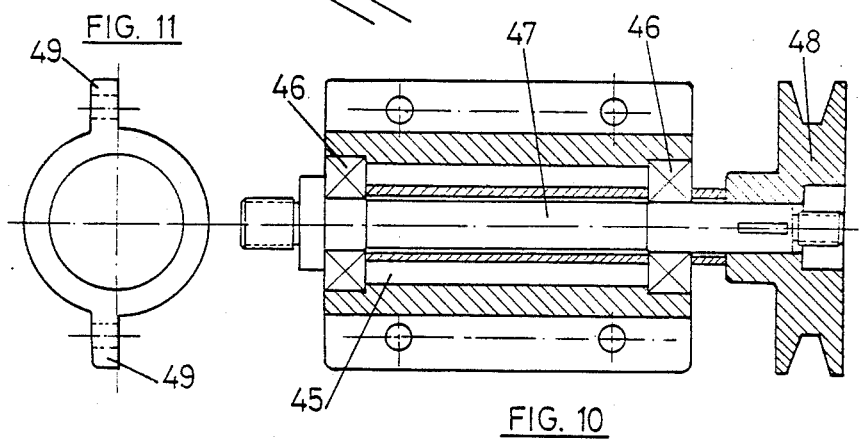
FIG. 11
FIG. 10

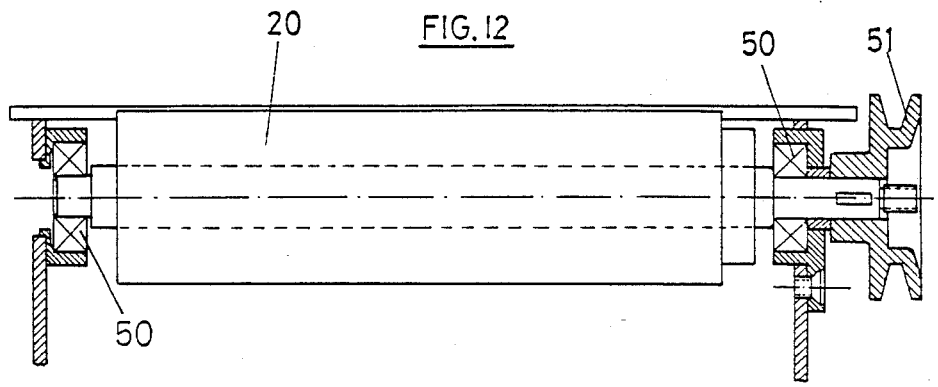
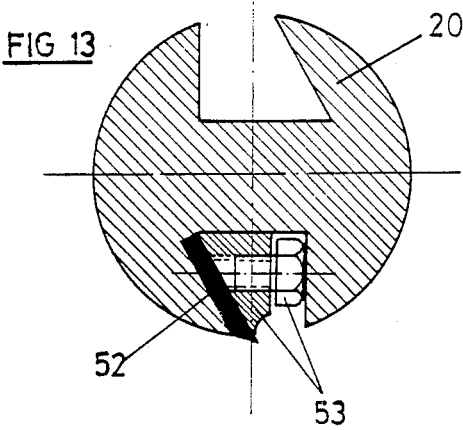

WOODWORKING MACHINE

The present invention refers to a multiple purpose woodworking machine, designed to be able to perform under maximum safety conditions a variety of operations, such as sawing, planing, sanding, drilling, routing, etc. The machine according to the invention corresponds to a typical model that is provided with a rotary prismatic headstock mounted rotationally about a horizontal axis which coincides with one of the axes of said headstock. The machine is supported by a framework. The headstock is provided on its lateral walls that are parallel to the axis of rotation with a number of woodworking tools, such as a saw blade, a planer, a sander and a tool holding device. These elements are actuated by means of independent pulleys which are positioned on the outside of one of the bases of the headstock. The power is generated by a drive motor and conveyed to the pulleys by means of a transmission belt.

The drive motor is preferably mounted on a swiveling plate which is articulated to the framework. This mounting system permits an increase or release of the tension of the transmission belt and to secure it to any of the individual work pulleys while bypassing the remaining ones. This construction mode assures maximum safety conditions for the operator of the machine because only one of the tooling elements of the headstock is operational at any time, while the others remain inactive. In this manner, any chance of accidental mishaps is minimized. In the machines of the type described before, whenever a change of the work tool of the headstock is required, it becomes necessary to relieve the tension of the belt by manually loosening the support plate of the motor. Also, the locking device of the headstock must be manipulated in order to effect a changeover of the belt from one pulley to another.

Afterwards the locking devices must be reset, as well as the support plate of the motor. All these manipulations result in delays and losses of time whenever a changeover of work tools occurs. In addition, this type of machines have their headstock designed so that the work element is positioned vertically and therefore making it impossible to perform certain operations which would require a different orientation for the work tools.

The main objective of the present invention is to provide a machine of the type described before, in which the tool holder that is mounted on the headstock may operate in other positions in addition to the vertical, for example horizontally or with an inclination angle of 45°.

In this manner, the tool holder may perform not only drilling operations but also routing work using preferably an orientation at an angle of 45°. The horizontal position of the tool holder would be adequate for turning, and polishing or buffing operations with the aid of a flexible shaft, etc. Another objective of the invention is to provide a machine in which it would be possible to simultaneously unlock the headstock so that it may be rotated manually and to permit the raising or lowering of the motor to relieve the tension of the transmission belt to changeover the pulleys, while at the same time freeing the hands of the operator of the machine for the performance of other tasks.

According to the present invention, the machine comprises a locking mechanism for the headstock which is constituted by a connecting rod, a locking lever for the headstock and an actuating pedal. The top of the connecting rod is articulated to one of the ends of the lever and its lower end engages with the actuating pedal.

The pedal is provided with a locking ratchet that engages with the support plate of the drive motor enabling it to adopt different positions in order to adjust the tension of the transmission belt.

One of the bases of the headstock, perpendicular to the axis of rotation, is provided with a notched element or crown. The notches may engage with the end of the locking lever and this makes it possible to activate at least one of the tool elements in different orientations, such as vertical, horizontal, or at an angle. The same base is also provided with an idler pulley that accepts the transmission belt. The notched element mentioned before consists of a crown that is affixed to one of the bases of the headstock, concentrically with its axis of rotation.

The locking lever is mounted on the framework and its fulcrum is located in the vicinity of one of the bearings of the axle of the headstock. At one of its ends, the lever has a claw that engages with the notches of the crown, and at the same end it is articulated to the connecting rod. The other end of the locking lever is spring loaded so that it is constantly being pulled toward the locking position and causing the claw to engage with one of the notches of the crown piece of the headstock.

The actuating pedal is constituted by an angular lever which is articulated to the framework by means of a horizontal axle. One of the sections or arms of the angular lever is articulated at its free end with the support plate of the motor along a longitudinal slot of said support plate. The other arm of the angular lever is articulated to the lower end of the connecting rod. It is also provided with a retractable claw that engages with a serrated arced member which acts as a locking mechanism for the pedal. Whenever the operator of the machine steps on the pedal, the claw retracts from its engagement with the serrated member.

All of the above mentioned characteristics, as well as the means that are used to mount each of the elements or tools on the headstock will be described in detail with the aid of the attached illustrations, which represent one execution of the invention that is shown as a non-limiting example:

FIG. 7 is a side view of the mounting mechanism for the tool holder.

FIG. 8 is a cross-section along the line VIII—VIII of FIG. 7.

FIG. 9 is a perspective view of the headstock, showing the mechanism that holds the saw blade.

FIG. 10 represents a longitudinal cross-section of the device that holds the sander.

FIG. 11 is a side view of the device shown in FIG. 10.

FIG. 12 is a view of the mechanism that holds the planer.

FIG. 13 is a cross-section of the planer shown in FIG. 12.

Figure 1:
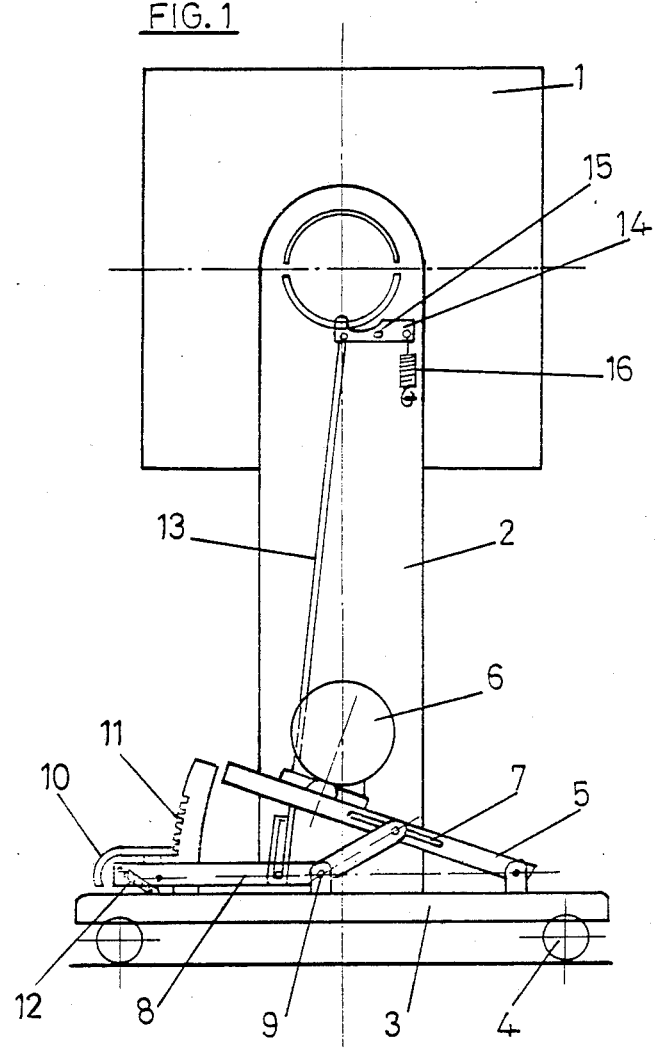
FIG. 1 represents a side view of the machine according to the invention.

As shown in FIG. 1, the machine comprises a rotatable headstock (1) which is shaped as a right prism of square cross-section, whose axis of rotation runs through the centerpoints of the bases. This headstock is mounted on a framework that consists of two vertical columns (2) and a lower base plate (3) which may be provided with rollers (4). Articulated to the base plate (3) there is a swiveling plate (5) onto which is affixed a drive motor (6).

The swiveling plate (5) is provided with a slot (7) at one of its sides, along which slides the end of one arm of an angular lever (8), whose fulcrum is shown at (9). The other arm of the angular lever (8) constitutes an actuating pedal which is provided with a latch (10) that is able to engage selectively with the teeth of the serrated ratchet sector (11).

The latch (10) is spring loaded by means of the spring (12), so that it is normally biased toward a locking engagement with the teeth (11).

Whenever the pedal portion of the angular lever (8) is activated, the latch (10) is forced to recede and in this manner the angular lever (8) is free to swivel. The angular lever (8) is also engaged with a rod (13) whose upper end is articulated to one end of a lever (14) whose fulcrum is at (15). The other end of the lever (14) is under constant load by means of the extension spring (16).

Figure 6:
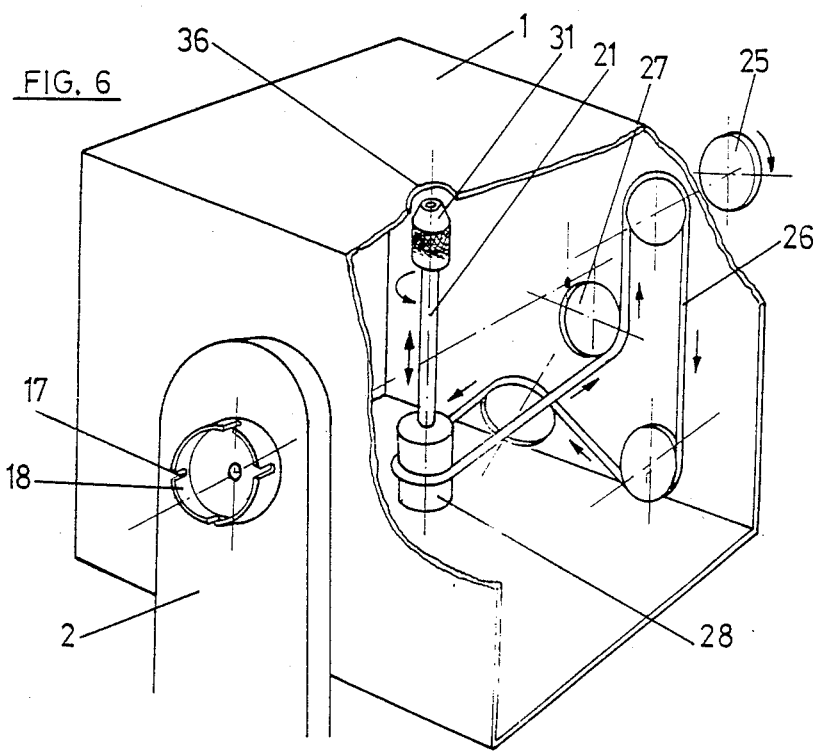
FIG. 6 depicts a partial perspective view, illustrating the actuating system of the tool holder.

The lever (14) is provided with a claw at the end at which it engages with the connecting rod (13). This claw may engage with any one of the notches (17) of the crown (18) which is concentric with the axis of rotation of the head stock (1) and is located in the vicinity of one of the columns (2) of the frame (see FIG. 6). Although FIG. 6 shows only four notches (17), the crown (18) may be provided with as many notches as may be required to orient the headstock in different positions.

Whenever the pedal or lever (8) is stepped on, the connecting rod (13) is displaced downward, pulling on the lever (14) until its claw releases from the corresponding notch (17). As a result, the headstock becomes free and may be turned manually to any desired position. At the same time, the plate (5) that supports the motor (6) is able to rise, relieving the tension on the transmission belt that links the pulley of the drive motor with the pulleys that actuate any of the different tool elements that are mounted on the headstock, as will be described later.

Figure 5:
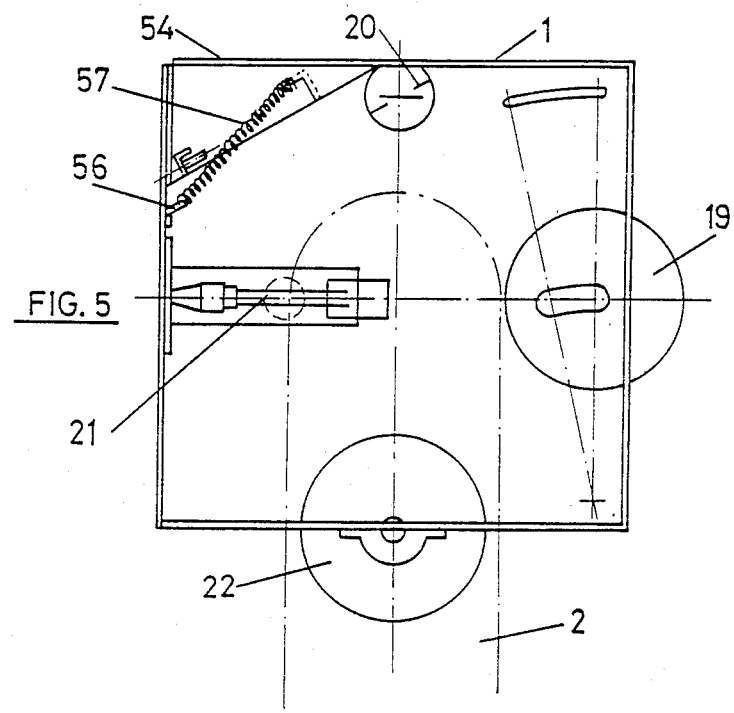
FIG. 5 is a schematic view of a cross-section of the headstock showing the different working elements incorporated on its lateral walls.

As may be seen in FIG. 5, the headstock (1) has mounted on its sides a number of tooling implements such as a saw blade (19), a planer (20), a tool holding device (21) and a sander (22). Each of these implements is actuated by independent pulleys that are positioned parallel to each other and in the vicinity of one of the bases of the headstock (1).

Figure 2:
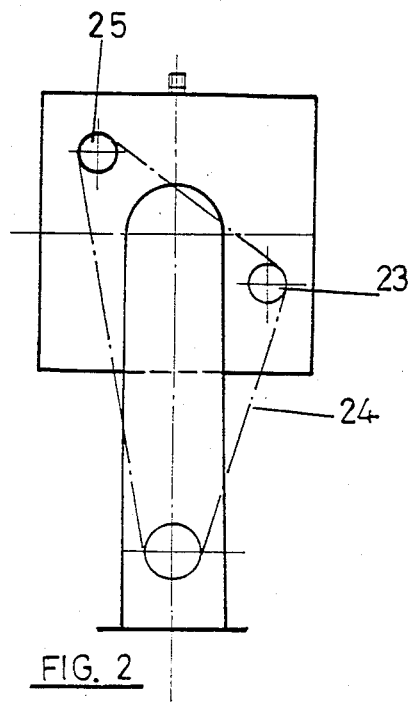
FIGS. 2, 3 and 4 show side views of the different operational positions of the headstock and the angular orientation of the tool holder.
Figure 3:
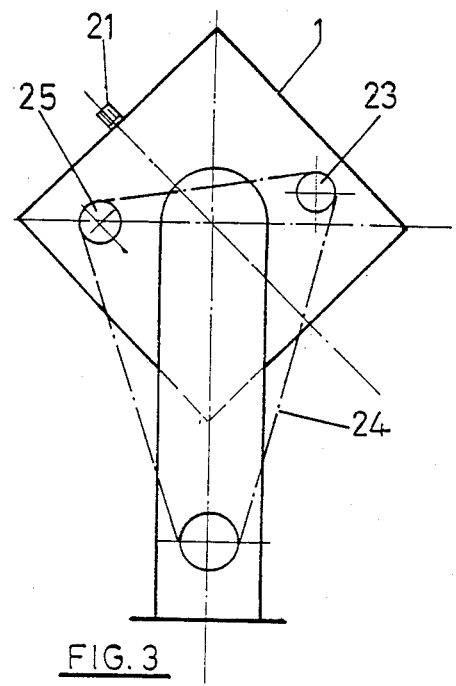
Figure 4:
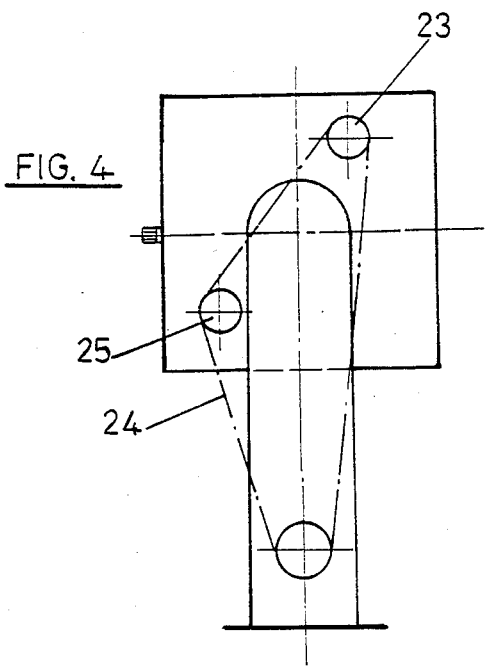

According to the present invention, the base of the headstock (1) near the actuating lever is provided with an additional idler pulley (23) (see FIGS. 2, 3 and 4) which maintains the tension of the transmission belt (24) constant as it activates the pulley (25) which drives the tool-holding element (21). Therefore, the tension of the belt is held even while the element (21) eventually changes its orientation to vertical, (FIG. 2), or to an inclination of 45° (FIG. 3), or to horizontal, as shown in FIG. 4. This versatility allows the tool-holder to perform multiple operations, such as drilling, routing, sanding, polishing, or buffing, etc.

As shown in FIG. 6, the tool-holder (21) is housed inside the headstock (1) and is powered by the drive pulley (25) which actuates the transmission belt (26). This belt has a circular cross-section and runs over several pulleys (27) that rotate in different directions. The belt (26) conveys it power to the cylindrical pulley (28) which is affixed to the tool-holder (21). The drive system represented in FIG. 6 permits to vary the direction of rotation of the tool-holder (21) without having to modify the direction of rotation of the drive motor. The belt (26) may therefor be repositioned without the need for removing any piece or screw. Furthermore, the cylindrical pulley (28) may be set to any desired position along its axis. The center shaft of the tool-holder (21) is held in a bushing (29) by means of the ball bearings (30). The lower end of the center shaft (21) is affixed to the pulley (28) while its upper end is attached to the chuck (31) as shown in FIG. 6, or to any other device for holding any particular tool.

The bushing (29), as shown in FIGS. 7 and 8, is adjustably mounted on a support bracket (32) which is rigidly affixed to the inside of the headstock. The bushing (29) has attached a radially positioned threaded pin (33) which runs through a longitudinal slot of the support bracket (32), and serves to secure the bushing to the headstock.

The position of the bushing (29) may be adjusted longitudinally by turning the set screw (35) in either direction. This regulation will cause an axial displacement of the slide (34) which is attached to the bushing (29), and as a result the position of the tool-holder (21) may be set any any particular point in relation to the orifice (36) of the wall of the headstock. The saw blade (19) may be mounted on the headstock as shown in FIG. 9, by means of a support constituted by a central body or hub (37) which holds the axle (38) of the saw blade and of the drive pulley. A pair of arms (39) projects from each end of the hub (37) and are provided with bearings (40) for the axle that attaches to the headstock. Another pair of arms (41) hold the threaded pin (42) which runs through a curved slot (43) cut into the adjacent wall of the headstock. The whole assembly described before may be rigidly secured to the headstock by tightening the set screw (44) on the threaded pin (42). This system makes it possible to control the distance at which the saw blade (19) emerges from the headstock, as well as its attachment and detachment.

FIGS. 10 and 11 represent the sanding device (22). It comprises a bushing (45) which holds the axle (47) that is supported by the bearings (46). One end of the axle has affixed the drive pulley (48) while the other end holds the sander. The bushing (45) is provided with two longitudinal projections (49) which are located diametrically opposite to each other and are rigidly attached to the walls of the headstock by means of bolts.

Finally, FIGS. 12 and 13 represent a mounting system for the planer (20), which is supported by the bearings (50). The axle of the planer projects downwards at one end, which has attached the drive pulley (51). The planer consists of a cylindrical body (20) provided with trapezoidal channels into which are affixed the cutters (52) by means of the wedge and set screw (53). The wall of the headstock onto which the planer (20 is mounted comprises a movable zone (54) which is adjacent to the planer. The cutters of the planer (20) are positioned near the stationary surface of the wall of the headstock which serves as support for the wooden workpiece as it emerges from the machine. The movable zone (54)

serves as support for the workpiece as it enters the machine. This zone (54) is placed onto a surface (55) which is inclined at an angle of about 30°. The height of the zone (54) may be adjusted in relation to the cutters of the planer (20) by sliding it along the inclined surface (55). In this manner, the dept of cut may be varied.

The zone (54) is spring loaded onto the inclined surface (55) by means of an extension spring (57), and its position is controlled by an adjustable screw (56).

All the different elements or tools may be changed easily and the machine according to the invention allows for them to be used individually, one at a time.

Whenever a tool changeover is needed, the operator presses on the pedal (8) to free the headstock (1), and then he turns it manually until the desired position is attained.

At the same time, as the tension of the transmission belt is relieved, the changeover to the pulley of another tool element may be performed.

It must be understood that the previous description is non limiting and that the constructive details mentioned before may be modified without altering the fundamental principles of the concept.

I claim:

1. A multiple purpose woodworking machine comprising
    a prismatic rotational headstock mounted on a framework so that it may turn around a horizontal axis, said headstock having a plurality of side walls that are parallel to said horizontal axis,
    woodworking elements such as a saw blade, a planer, a sander and a tool-holder each mounted on one of said side walls, all of said woodworking elements being driven by independent pulleys located parallel to and near one of the bases of said headstock,
    a drive motor mounted on a swiveling support plate that is articulated to said framework,
    a transmission belt connectable between said drive motor and said pulleys for convening power to one of said pulleys as selected by the machine's user, said motor support plate being raised or lowered for the purpose of increasing or relieving the tension of said transmission belt between said motor and a selected one of said drive pulleys that activates a selected one of said woodworking elements,
    an idler pulley mounted on said headstock for said transmission belt, said idler pulley permitting the activation of at least one of said woodworking elements in any one of a vertical, horizontal or inclined orientation of that one woodworking element,
    a locking device for holding said headstock in its desired operational position, said locking device comprising a connecting rod, a locking lever and an actuating pedal, said connecting rod being articulated at its upper end to one end of said lever and at the opposite end to said pedal,
    a notched element mounted on said headstock to cooperate with said locking lever, and
    a locking latch connected with said pedal and also connected with said motor support plate.

2. A machine according to claim 1, said notched element comprising
    a crown piece which is fixed to said headstock on an axis concentric with said headstock's horizontal axis.

3. A machine according to claim 1, said locking lever being mounted on said framework on an axis located near said headstock's axis, one end of said locking lever having a claw which may engage with said notched element, that same end also being connected with said connecting rod, and the other end of said locking lever being connected to an extension spring which biases said one end constantly toward said notched element.

4. A machine according to claim 1, said actuating pedal comprising
    an angular lever that is pivotally connected at its elbow to said framework, one of the arms of said angular lever being slideably connected to said motor support plate along a longitudinal slot formed in said support plate, and the other arm of said angular lever being connected with the lower end of said connecting rod, and
    said locking latch comprising
    a retractable latch and serrated sector.

5. A machine according to claim 1, said machine comprising
    a saw blade support located in said headstock, said saw blade support comprising a central hub and lateral coplanar arms extending from each side of said hub, said hub serving as a bearing for said saw blade's axle, said axle being affixed to one of said drive pulleys, said lateral arms being positioned generally opposite to each other with respect to the centerline of said hub in order to lie approximately in a horizontal plane, that arm situated at one side of said hub being pivotally connected to said headstock to define a pivot axis parallel to said saw blade axle, that arm situated at the other side of said hub being provided with a threaded pin which is also parallel to said saw blade axle, said threaded pin extending through an arced slot in said headstock, and a set screw on said threaded pin for holding said saw blade support in desired operational position relative to said arced slot in said headstock.

6. A machine according to claim 1, said machine comprising
    a sander support mounted on said headstock, said sander support comprising a tubular cylindrical support member that receives bearings for carrying said sander's axle, said sander's axle having a drive pulley at one of its ends and a sanding head at the other of its ends, and longitudinal diametrically opposite placed brackets mounted on said tubular support member, said brackets serving to attach said sander support to one of the walls of said headstock.

7. A machine according to claim 1, said machine comprising
    a tool holder support mounted on said headstock, said tool holder support comprising an axle that is perpendicular to one of said headstock's side walls, said axle being mounted on a bushing that is provided with ball bearings, said bushing being attached to a support member with respect to which said tool holder may be longitudinally displaced, said axle having a drive pulley mounted to one of its ends, and said axle having a tool holding chuck mounted at the other of its ends, said chuck being positioned near a hole in said headstock's side wall.

8. A machine according to claim 1, said machine comprising
    a bracket and a movable slide that cooperates with one of said woodworking elements, said bracket being attached interiorly of said headstock in a position oriented parallel to said one woodworking element's axle, said slide bearing against said bracket, and a threaded spindle located exteriorly of said headstock, said spindle being connected to said slide for controlling the position of said slide, said one woodworking element being affixed to said slide by a threaded pin and a locking set screw.

9. A machine according to claim 7, said tool holder's pulley being powered from one of said drive pulleys by a round belt which runs over several idler pulleys mounted interiorly of said headstock, said interior pulleys serving to control the tension of said round belt and to change the direction of rotation of said tool holder.

* * * * *